United States Patent
Zanoni et al.

(10) Patent No.: US 10,177,354 B2
(45) Date of Patent: Jan. 8, 2019

(54) ENERGY STORAGE DEVICE HAVING IMPROVED THERMAL PERFORMANCE

(71) Applicant: General Electric Company, Schenectady, NY (US)

(72) Inventors: Michael Stanley Zanoni, Glens Falls, NY (US); Kenneth McClellan Rush, Ballston Spa, NY (US); Christopher Richard Smith, Saratoga Springs, NY (US); James Thorpe Browell, Saratoga Springs, NY (US); Wenpeng Liu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 619 days.

(21) Appl. No.: 14/848,682

(22) Filed: Sep. 9, 2015

(65) Prior Publication Data

US 2017/0069885 A1 Mar. 9, 2017

(51) Int. Cl.
*H01M 2/10* (2006.01)
*H01M 10/627* (2014.01)
*H01M 10/6562* (2014.01)
*H01M 10/39* (2006.01)
*H01M 10/6556* (2014.01)
*H01M 10/617* (2014.01)
*H01M 10/6565* (2014.01)
*H01M 10/6566* (2014.01)
(Continued)

(52) U.S. Cl.
CPC ....... *H01M 2/1077* (2013.01); *H01M 2/1088* (2013.01); *H01M 10/399* (2013.01); *H01M 10/613* (2015.04); *H01M 10/617* (2015.04); *H01M 10/627* (2015.04); *H01M 10/6556* (2015.04); *H01M 10/6562* (2015.04); *H01M 10/6565* (2015.04); *H01M 10/6566* (2015.04); *H01M 6/36* (2013.01); *H01M 2300/0057* (2013.01)

(58) Field of Classification Search
CPC ............. H01M 2/1077; H01M 10/613; H01M 10/6565; H01M 10/617; H01M 10/6556; H01M 10/6566; H01M 10/399; H01M 2/1088; H01M 10/627; H01M 10/6562; H01M 2300/0057; H01M 6/36
USPC .......................................................... 429/50
See application file for complete search history.

(56) References Cited

U.S. PATENT DOCUMENTS

| | | | |
|---|---|---|---|
| 2009/0191452 A1* | 7/2009 | Anantharaman | H01M 6/42 429/120 |
| 2013/0164594 A1* | 6/2013 | Zahn | H01M 2/021 429/120 |
| 2016/0172637 A1* | 6/2016 | Hamada | H01M 2/0252 429/163 |

* cited by examiner

*Primary Examiner* — Gary D Harris
(74) *Attorney, Agent, or Firm* — Dority & Manning, P.A.

(57) ABSTRACT

The present disclosure is directed to an energy storage device having improved thermal performance. More specifically, the energy storage device includes a housing with side walls that define an internal volume. The side walls include bottom and front side walls, with the front side wall having an air inlet and outlet configured to circulate cooling air therethrough. The energy storage device also includes a plurality of cells arranged in a matrix within the internal volume atop the bottom side wall. Further, the cells define a top surface. Further, the energy storage device includes an exhaust manifold adjacent to the front side wall between at least a portion of the cells and the air inlet. Thus, the exhaust manifold is configured to direct airflow from the top surface towards the bottom side wall and then to the air outlet so as to provide an airflow barrier between cooling air entering the air inlet and the cells.

20 Claims, 14 Drawing Sheets

(51) Int. Cl.
*H01M 10/613* (2014.01)
*H01M 6/36* (2006.01)

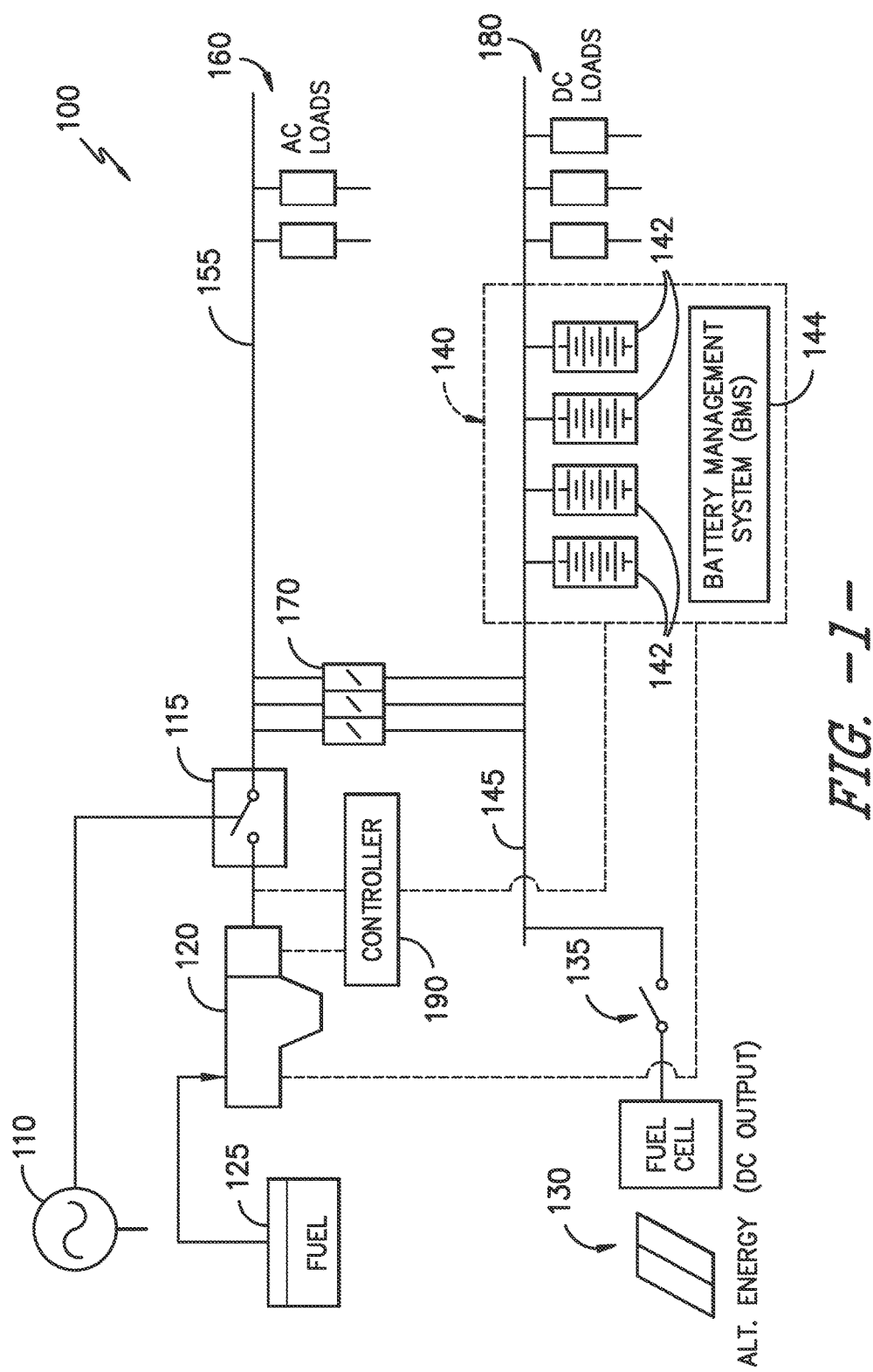
FIG. -1-

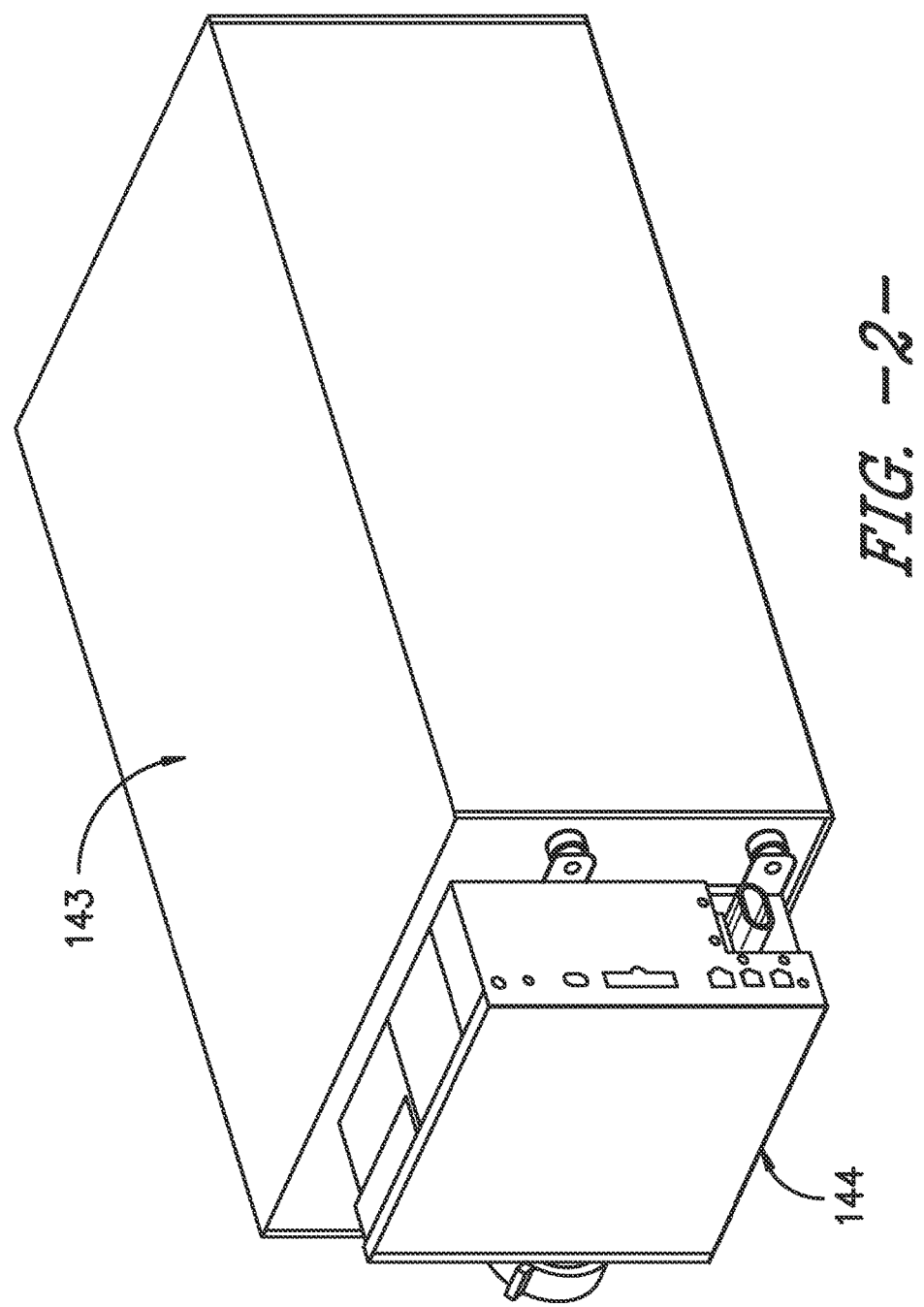

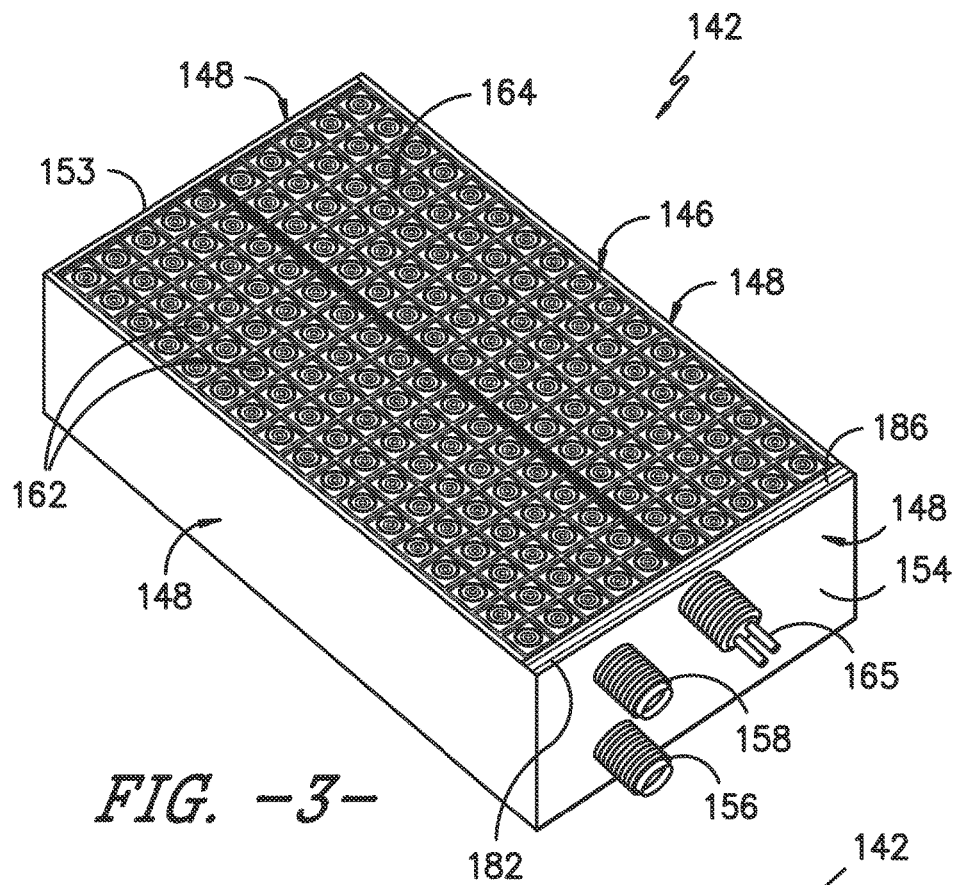
FIG. -3-
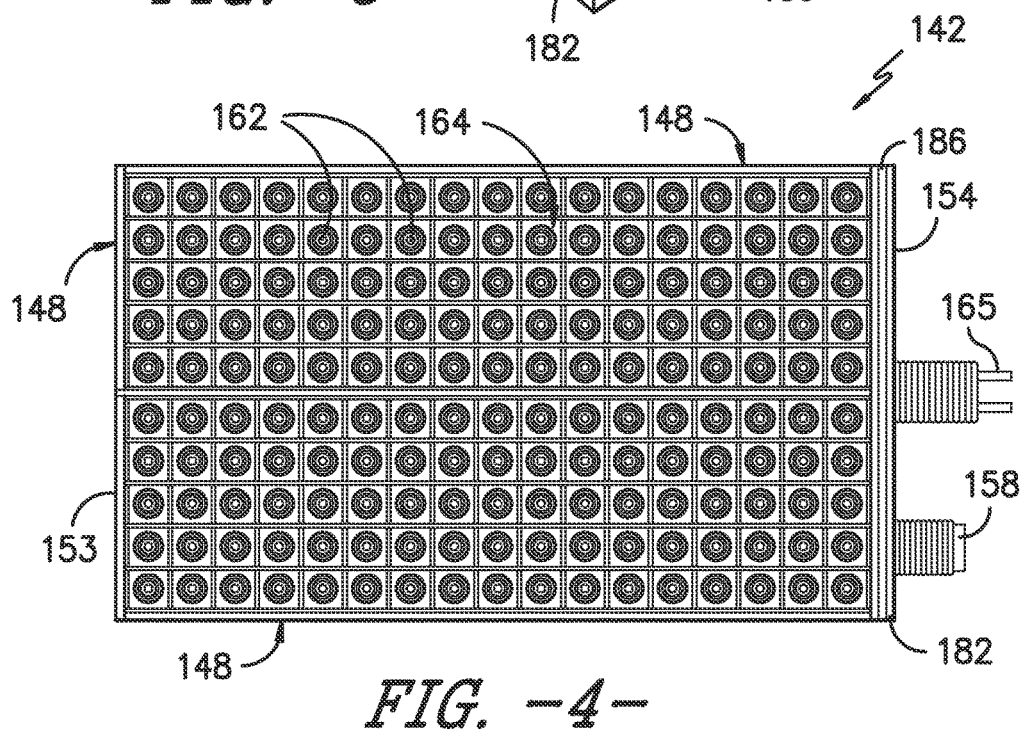
FIG. -4-

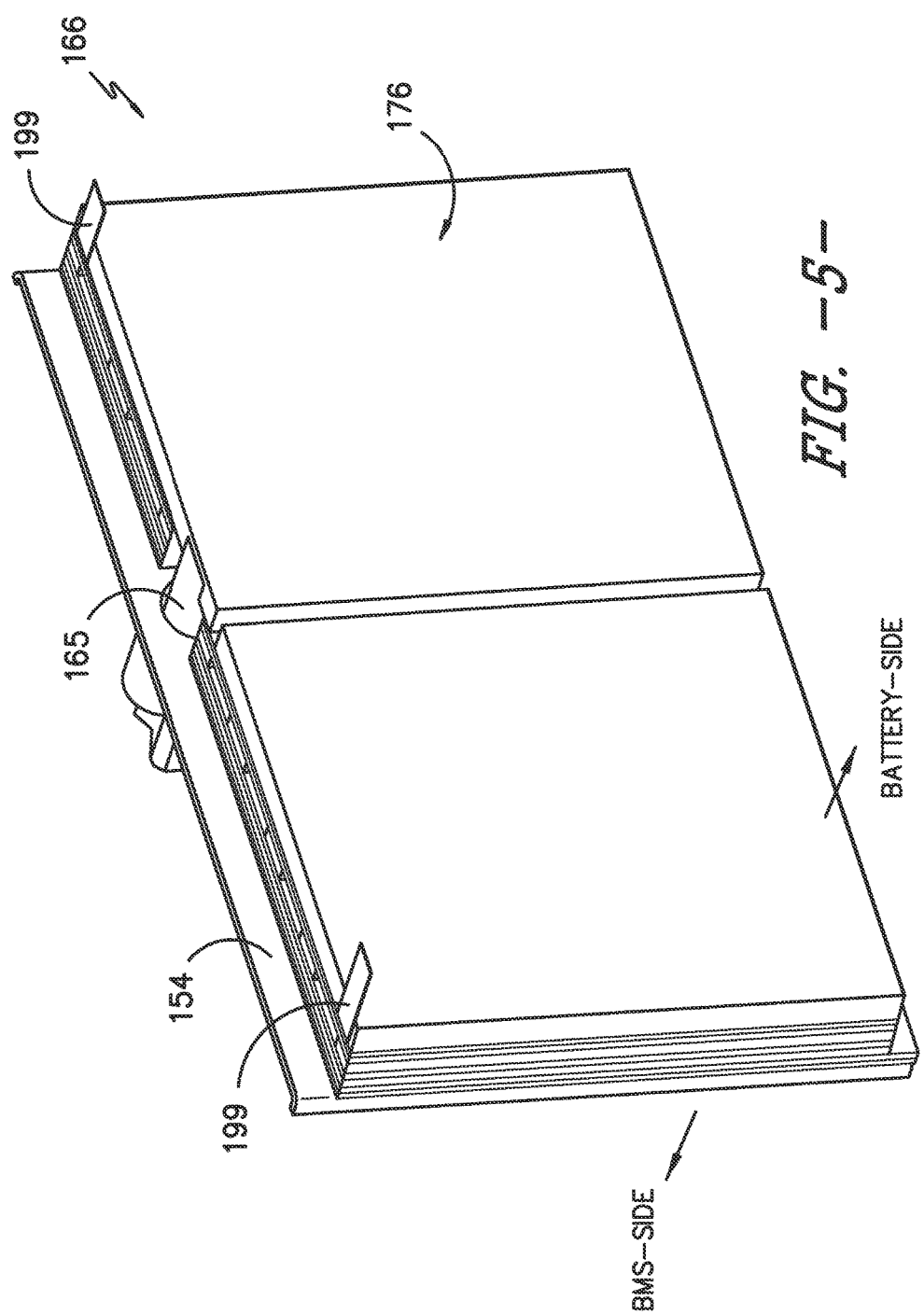
FIG. -5-

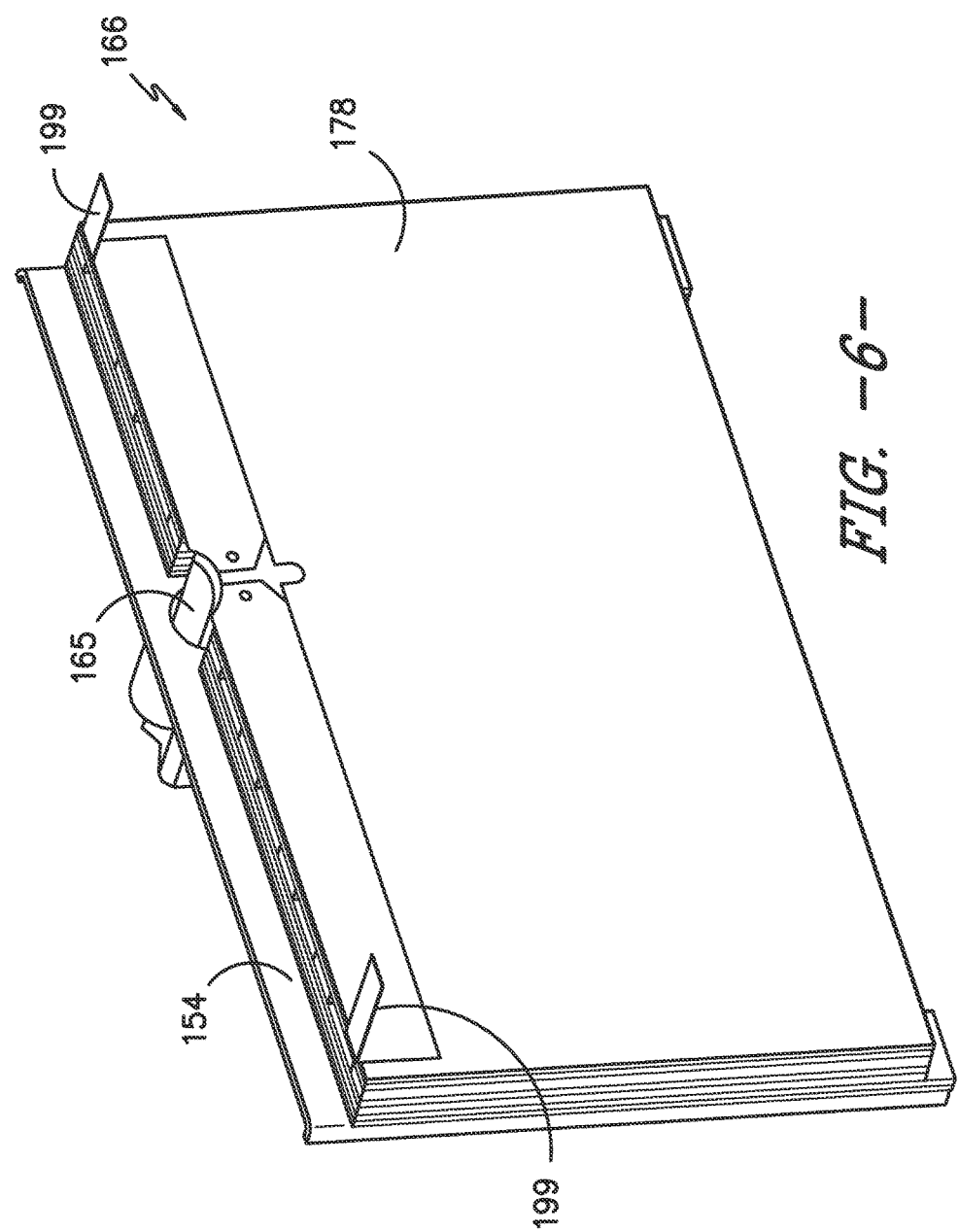
FIG. -6-

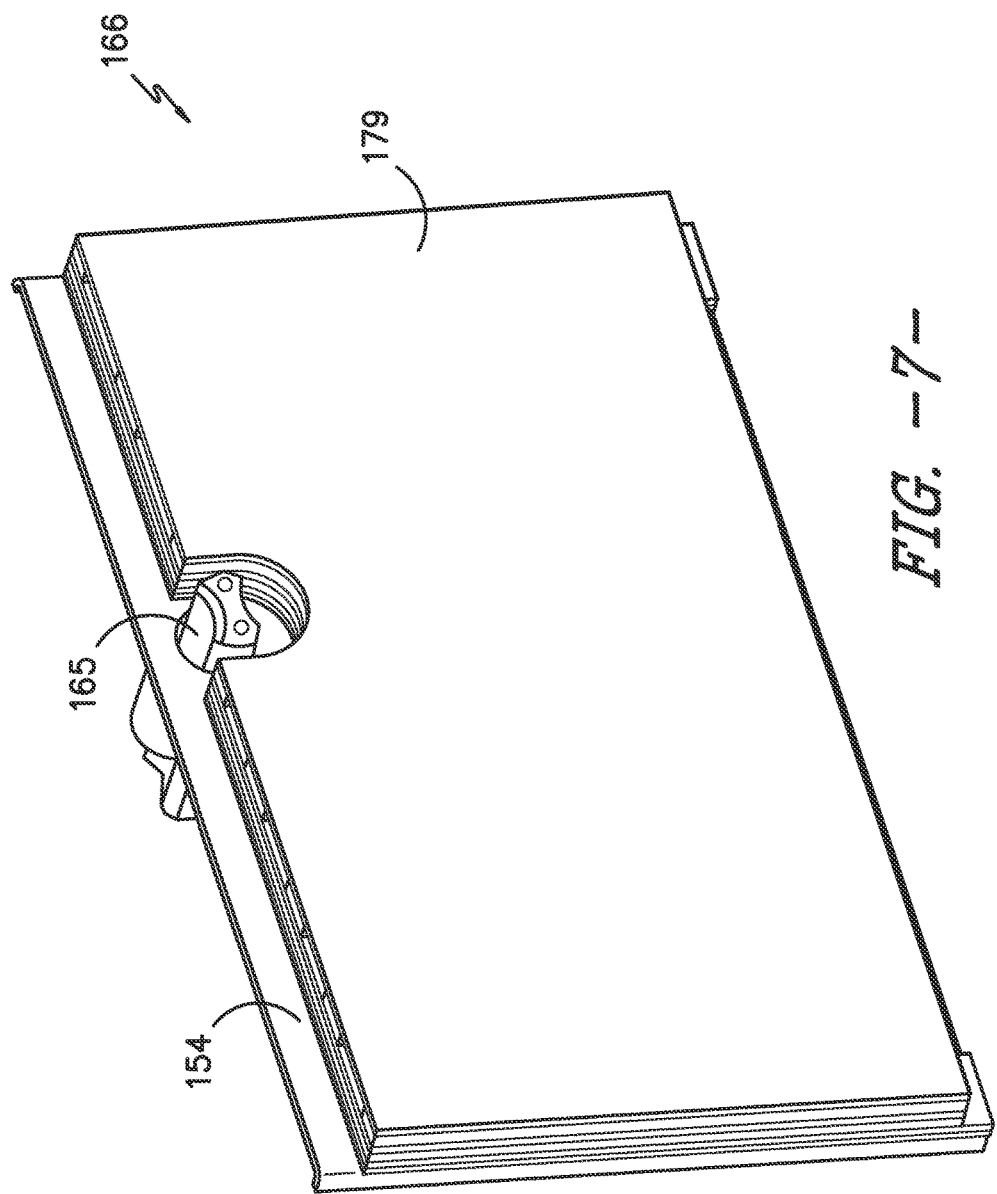

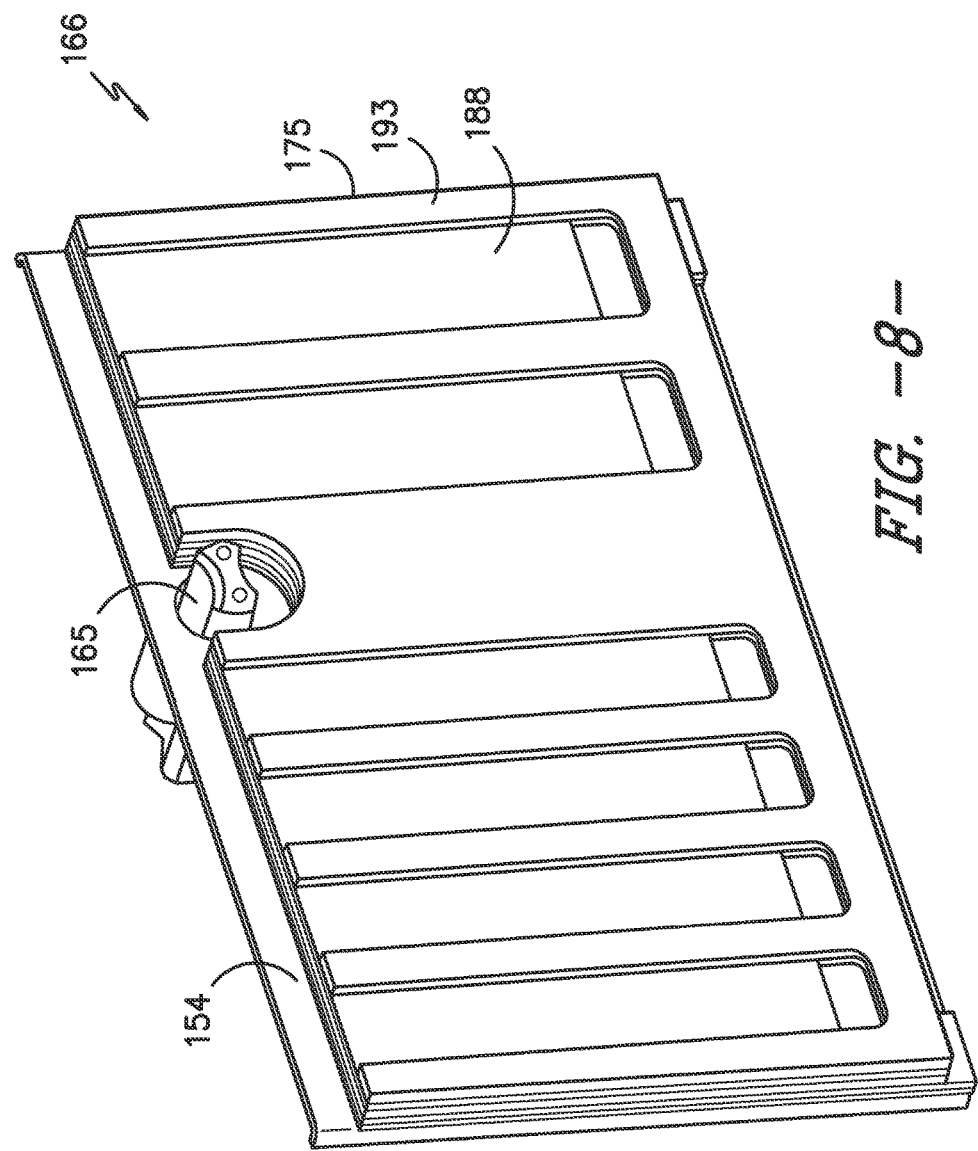
FIG. -8-

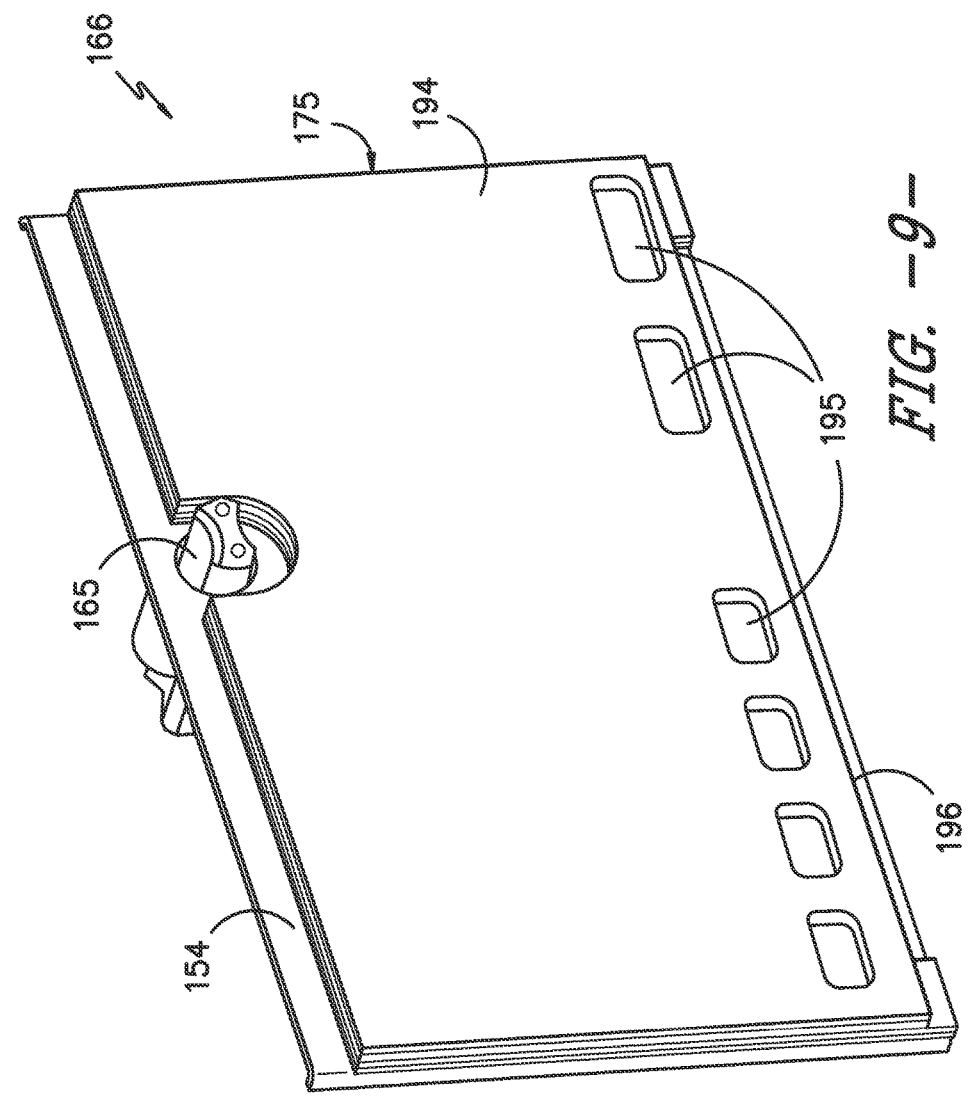
FIG. -9-

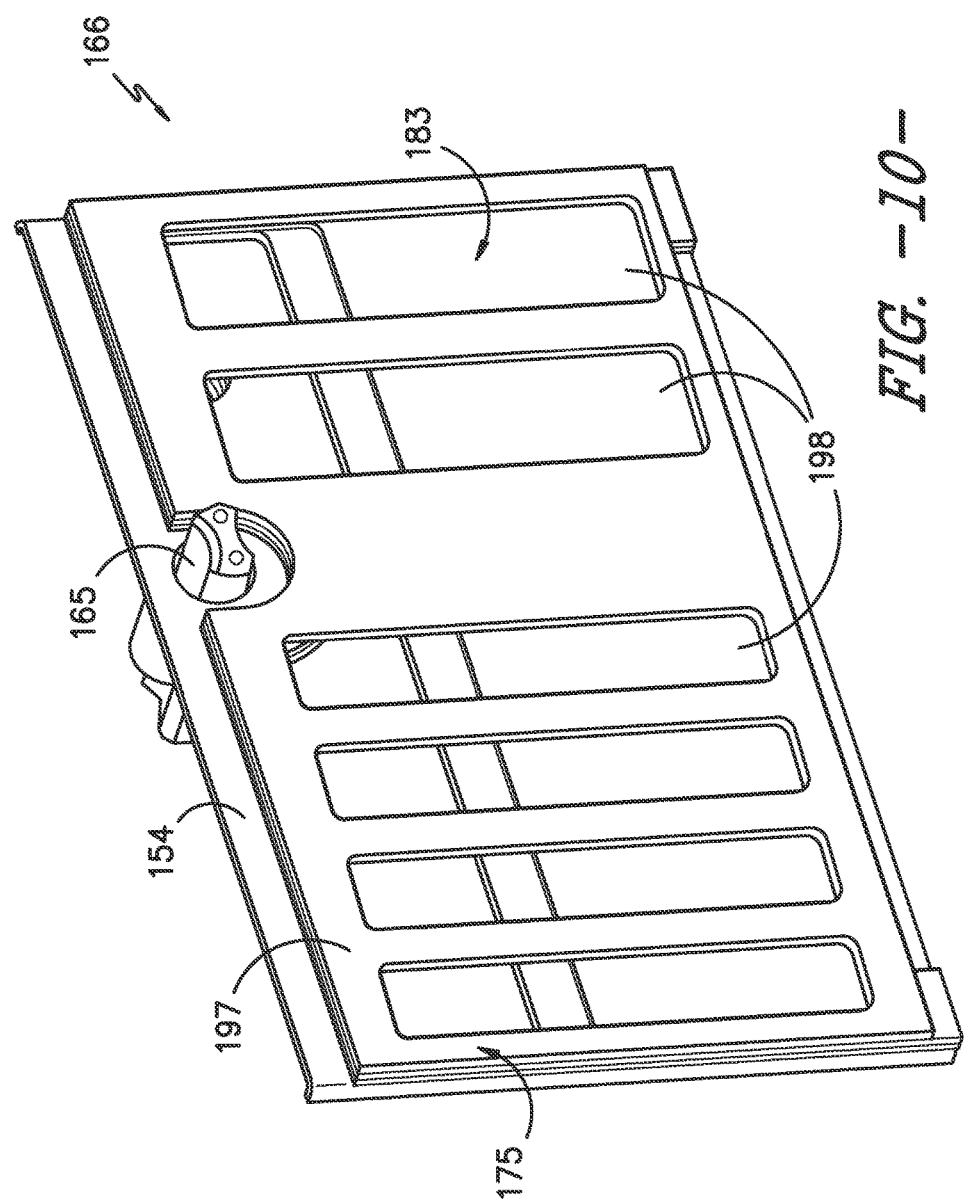

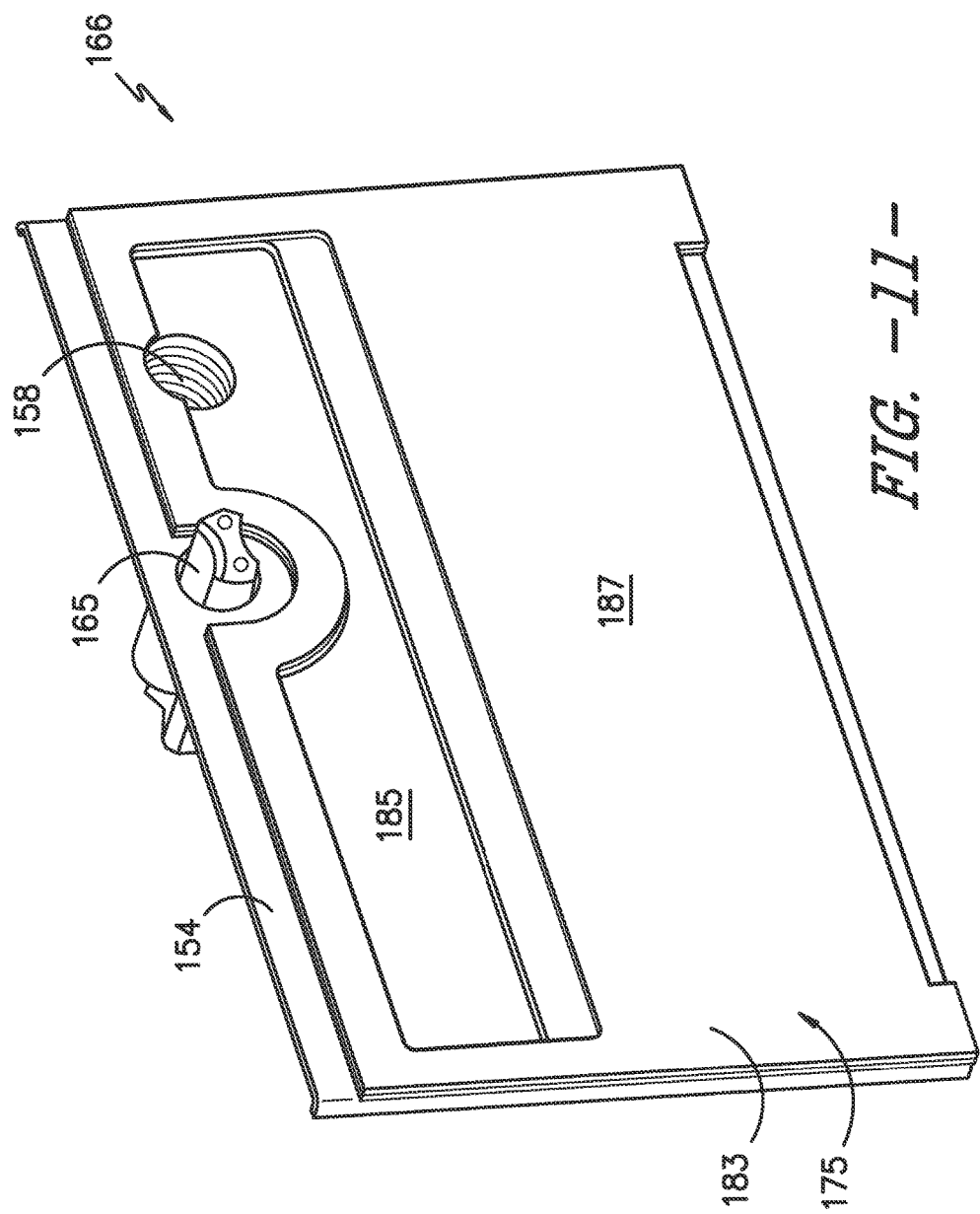

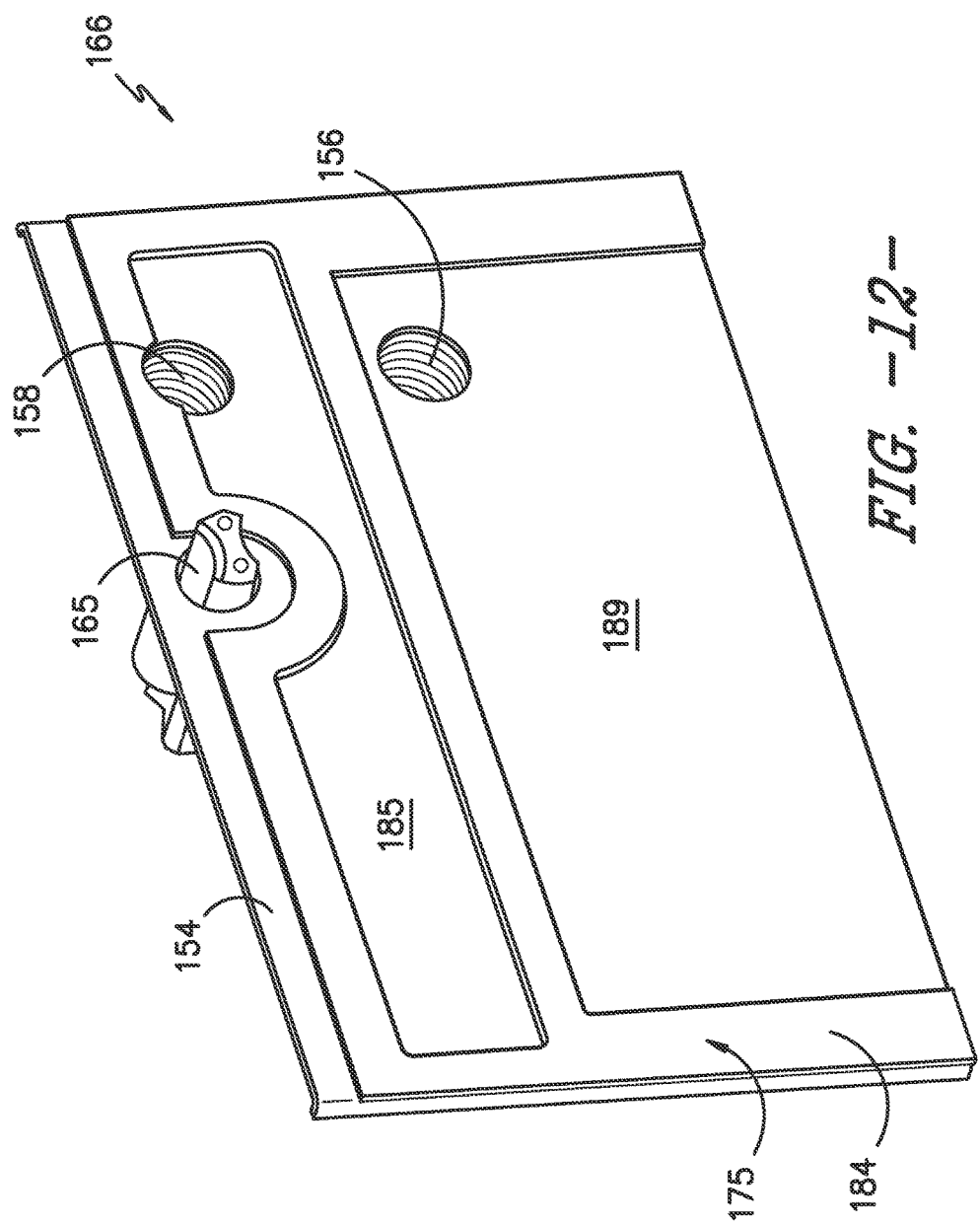
FIG. -12-

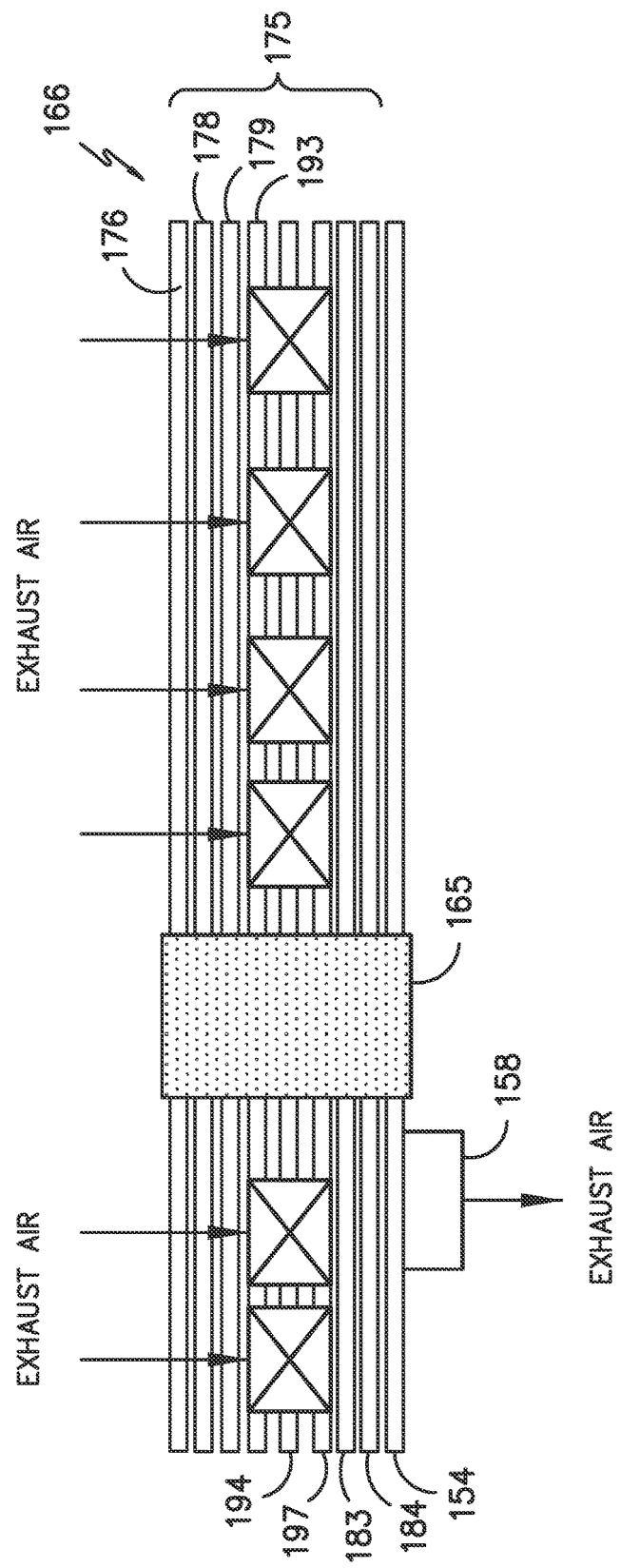
FIG. -13-

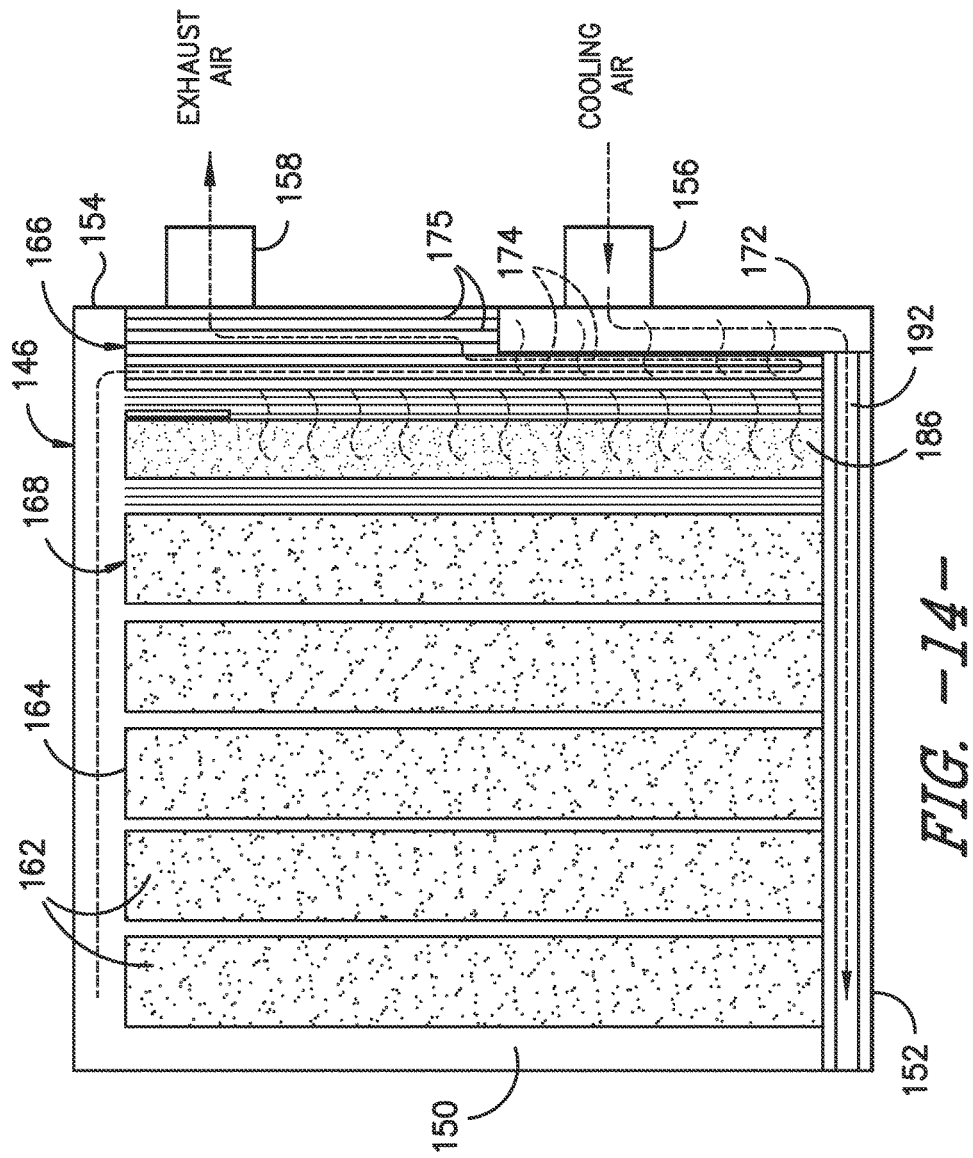
FIG. -14-

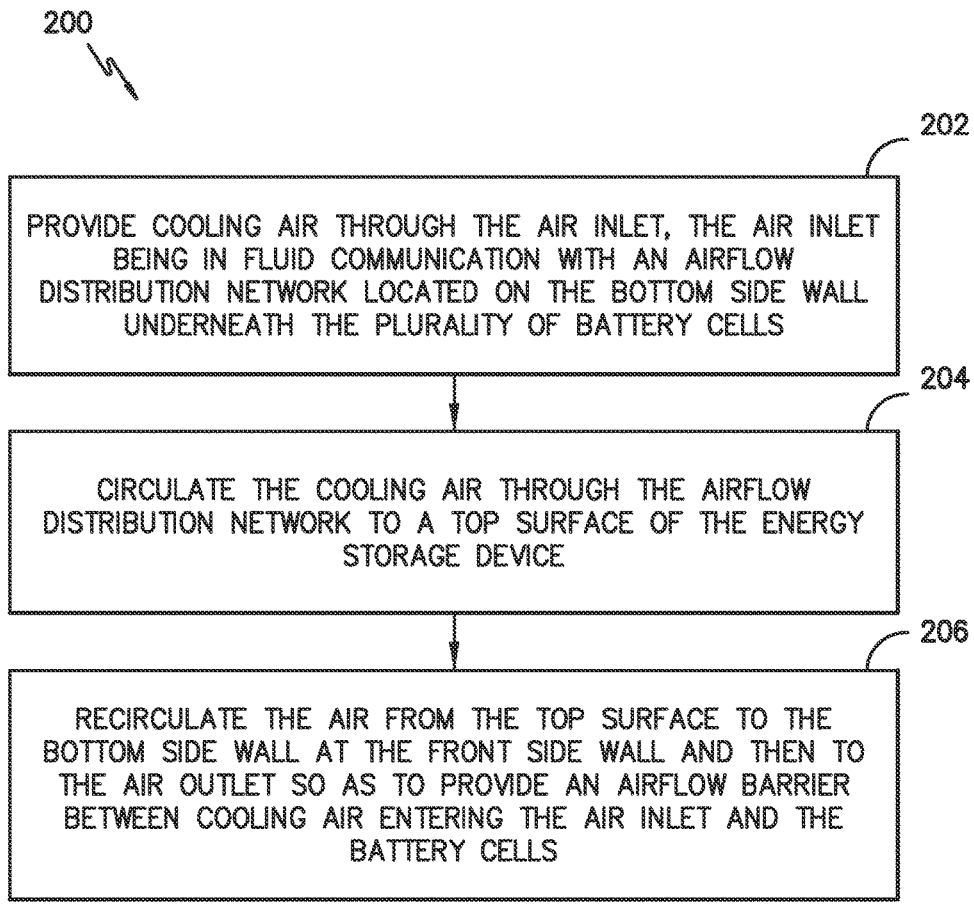
FIG. -15-

ENERGY STORAGE DEVICE HAVING IMPROVED THERMAL PERFORMANCE

FIELD OF THE INVENTION

The present disclosure relates generally to energy storage devices, and more particularly to an energy storage device having reduced temperature variability between cells.

BACKGROUND OF THE INVENTION

Typically, for an off-grid or weak-grid consuming entity, e.g. a telecom facility, the main power source may include a hybrid engine-generator/battery system that can be used in backup situations. For example, if power from the commercial utility is lost, the engine-generator set can be activated to supply power to the facility. Start-up of the engine-generator set, however, takes time; therefore, the battery can provide power during this transitional time period. If the engine-generator set fails to start (e.g., runs out of fuel, suffers a mechanical failure, etc.), then the battery is able to provide power for an additional period of time. In this way, electrical energy production does not have to be drastically scaled up and down to meet momentary consumption. Rather, production can be maintained at a more constant level. Thus, electrical power systems can be more efficiently and easily operated at constant production levels.

Other battery applications may include a grid-connected energy storage system and/or motive-based storage. For example, such grid-connected battery systems can be utilized for peak shaving for commercial/industrial plants, buffering peak loads in distribution grids, energy trading, buffering solar power for night time, upgrade of solar/wind power generation, and/or any other suitable application.

In the battery applications described above, as well as any other suitable battery applications, it is important to maintain a uniform temperature between the cells of the battery pack or module. For modern designs, the cooling hardware flows air underneath the battery pack and then over the top. However, since the airflow is not sealed, some of the air flows over the front cells as the air enters the battery, thereby causing the front cells to cool more than the remaining cells. When the cells get colder, their internal electrical resistances increase, which can drive a higher voltage across the cells during recharge at a fixed current flow. This higher voltage can damage the cold cells, which can degrade the performance and/or reliability of the battery.

Thus, it would be advantageous to provide an improved energy storage device having reduced temperature variability between cells.

BRIEF DESCRIPTION OF THE INVENTION

Aspects and advantages of the invention will be set forth in part in the following description, or may be obvious from the description, or may be learned through practice of the invention.

One example aspect of the present disclosure is directed to an energy storage device having reduced temperature variability between cells. More specifically, in certain embodiments, the energy storage device includes a housing having one or more side walls that define an internal volume. The side walls include, at least, a bottom side wall and a front side wall, with the front side wall having an air inlet and an air outlet. The energy storage device also includes a plurality of cells arranged in a matrix within the internal volume of the housing atop the bottom side wall. Further, the plurality of cells defines a top surface. In addition, the energy storage device includes an exhaust manifold adjacent to the front side wall between at least a portion of the cells and the air inlet. Thus, the exhaust manifold is configured to direct airflow from the top surface of the cells towards the bottom side wall of the housing and then to the air outlet so as to provide an airflow barrier between cooling air entering the air inlet and the cells.

In one embodiment, for example, cooling air may be provided to the air inlet and to an airflow distribution network configured with the bottom side wall of the housing and extending from the front side wall to a rear side wall of the housing. Thus, the airflow distribution network is configured to direct airflow from the air inlet to the rear side wall and then to the top surface of the cells.

In another embodiment, the exhaust manifold may further include a plurality of thermal plates arranged in a stacked configuration. More specifically, the thermal plates may include one or more electrical insulation plates (e.g. mineral plates) and/or one or more baffle plates stacked together so as to direct exhaust air in front of the air inlet before exiting through the air outlet. For example, the thermal plates may include one or more passageways such that, when arranged together in a predetermined configuration, directs airflow as described herein.

For example, in certain embodiments, the exhaust manifold may include a first electrical insulation plate having one or more airflow passageways configured to direct the airflow from the top surface of the cells towards the bottom side wall of the housing. Moreover, in particular embodiments, a number of airflow passageways of the first electrical insulation plate may correspond to a number of cells in a front row of the matrix adjacent to the front side wall of the housing.

In addition, in further embodiments, the exhaust manifold may include a baffle plate adjacent to the first electrical insulation plate on a battery-management-system side thereof. Further, the baffle plate may include one or more airflow passageways in fluid communication with the one or more airflow passageways of the first electrical insulation plate. Thus, the exhaust manifold may include a second electrical insulation plate adjacent to the baffle plate on a battery-management-system side thereof. Further, the second electrical insulation plate may also include one or more airflow passageways in fluid communication with the one or more airflow passageways of the baffle plate so as to direct the airflow up towards the air outlet of the housing.

In still additional embodiments, the exhaust manifold may also include one or more additional thermal plates adjacent to the second electrical insulation plate on a battery-management-system side thereof. Further, the additional thermal plate(s) may have one or more openings in fluid communication with the one or more airflow passageways of the second electrical insulation plate. Thus, at least one of the additional thermal plates may have a closed bottom portion that provides an airflow barrier between the air inlet. In addition, at least another one of the additional thermal plates has a bottom opening that directs air entering the air inlet into the airflow distribution network.

In certain embodiments, the exhaust manifold may also include an end cover configured on a battery-side of the first electrical insulation plate. Thus, in certain embodiments, the end cover may be configured to provide a cover to the exhaust manifold so as to control airflow, e.g. by blocking airflow.

It should be understood that the thermal plates as described herein may be constructed of any suitable thermal material. For example, as mentioned, one or more of the thermal plates may be constructed, at least in part, of an electrical insulation material, e.g. a electrical insulation plate. In such embodiments, the electrical insulation plates may be constructed, at least in part, of mica. In additional embodiments, the thermal plates may be constructed of a conductive material, e.g. a metal or a metal alloy. For example, in one embodiment, the thermal plates may be constructed, at least in part, of copper, aluminum, steel, zinc, brass, iron, nickel, and/or similar, or combinations thereof. In additional embodiments, the energy storage device may include at least one of a sodium nickel chloride battery, a sodium sulfur battery, a lithium ion battery, a nickel metal hydride battery, or similar.

In another aspect, the present disclosure is directed to an exhaust manifold for an energy storage device having multiple cells. The exhaust manifold includes a plurality of electrical insulation plates (e.g. electrical insulation plates) arranged in a stacked configuration and at least one baffle plate arranged intermittently between the stacked electrical insulation plates. Thus, the stacked plates are configured to direct airflow from a top surface of the cells towards a bottom side wall of the housing of the energy storage device and then up to an air outlet of the energy storage device so as to provide an airflow barrier between cooling air entering an air inlet of the energy storage device and the cells.

In another aspect, the present disclosure is directed to a method for reducing temperature variability between a plurality of cells in an energy storage device having a housing with a bottom side wall and a front side wall, the front side wall having an air inlet and an air outlet. The method includes providing cooling air through the air inlet, the air inlet being in fluid communication with an airflow distribution network located on the bottom side wall underneath the plurality of cells. Another step of the method includes circulating the cooling air through the airflow distribution network to a top surface of the energy storage device. The method further includes recirculating the air from the top surface to the bottom side wall at the front side wall and then to the air outlet so as to provide an airflow barrier between cooling air entering the air inlet and the cells. Thus, the airflow barrier, which contains hot exhaust air from the top surface of the cells, protects the front row of cells from incoming cold air which can cause excessive cooling.

In further embodiments, the step of recirculating the air from the top surface back to the bottom side wall at the front side wall and then up to the air outlet may further include positioning an exhaust manifold between a front row of the cells and the front side wall of the housing, and circulating the cooling air through the exhaust manifold.

In another embodiment, the method may also include arranging a plurality of electrical insulation plates (e.g. electrical insulation plates) in a stacked configuration and intermittently placing at least one baffle plate between the stacked electrical insulation plates to form the exhaust manifold. Thus, in such embodiments, the method may further include circulating the cooling air through one or more air passageways of a first electrical insulation plate towards the bottom side wall of the housing. In addition, the method may include circulating the cooling air through a baffle plate and then to a second electrical insulation plate, wherein one or more air passageways of the baffle plate and/or the second electrical insulation plate directs the air up towards the air outlet of the housing.

Further, in certain embodiments, the method may include circulating the cooling air through one or more openings of at least one additional thermal plates adjacent to the second electrical insulation plate on a battery-management-system side thereof and to the air outlet. More specifically, at least one of the additional thermal plates may have a closed bottom portion that provides an airflow barrier from the air inlet. In addition, at least another one of the additional thermal plates may have a bottom opening that directs air entering the air inlet into the airflow distribution network.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of one embodiment of a hybrid power system configured to utilize one or more energy storage devices according to the present disclosure;

FIG. 2 illustrates a perspective view of one embodiment of an energy storage device having reduced temperature variability between cells according to the present disclosure;

FIG. 3 illustrates a perspective view of one embodiment of an energy storage device having reduced temperature variability between cells according to the present disclosure;

FIG. 4 illustrates a top view of the energy storage device of FIG. 3;

FIG. 5 illustrates a perspective view of one embodiment of an exhaust manifold for an energy storage device according to the present disclosure;

FIG. 6 illustrates a partial, perspective view of one embodiment of an exhaust manifold for an energy storage device according to the present disclosure, particularly illustrating an insulation cover plate removed;

FIG. 7 illustrates a partial, perspective view of one embodiment of an exhaust manifold for an energy storage device according to the present disclosure, particularly illustrating a busbar support plate removed to illustrate an end cover of the exhaust manifold;

FIG. 8 illustrates a partial, perspective view of one embodiment of an exhaust manifold for an energy storage device according to the present disclosure, particularly illustrating the end cover of the exhaust manifold removed to illustrate a first mineral plate having one or more air passageways;

FIG. 9 illustrates a partial, perspective view of one embodiment of an exhaust manifold for an energy storage device according to the present disclosure, particularly illustrating one or more plates removed to illustrate a baffle plate having one or more air passageways on a lower portion thereof;

FIG. 10 illustrates a partial, perspective view of one embodiment of an exhaust manifold for an energy storage device according to the present disclosure, particularly illustrating one or more plates removed to illustrate a second mineral plate having one or more air passageways;

FIG. 11 illustrates a partial, perspective view of one embodiment of an exhaust manifold for an energy storage device according to the present disclosure, particularly illustrating an additional thermal plate having one or more air passageways;

FIG. 12 illustrates a partial, perspective view of one embodiment of an exhaust manifold for an energy storage device according to the present disclosure, particularly illustrating an outer-most thermal plate having one or more air passageways;

FIG. 13 illustrates a top, schematic view of one embodiment of an exhaust manifold for an energy storage device according to the present disclosure, particularly illustrating airflow being directed through the manifold;

FIG. 14 illustrates a side, schematic view of one embodiment of an exhaust manifold for an energy storage device according to the present disclosure, particularly illustrating airflow being directed through the manifold; and FIG. 15 illustrates a flow diagram of one embodiment of a method for reducing temperature variability between cells of an energy storage device according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an energy storage device having reduced temperature variability between cells. Thus, the present disclosure can be utilized in any suitable battery application, including but not limited to a consuming entity, a grid-connected energy storage system, and/or motive-based storage. In various embodiments, the energy storage device includes a housing having one or more side walls that define an internal volume. The side walls include, at least, a bottom side wall and a front side wall, with the front side wall having an air inlet and an air outlet configured to circulate cooling air through the energy storage device. The energy storage device also includes a plurality of cells, e.g. sodium nickel chloride cells, arranged in a matrix within the internal volume of the housing atop the bottom side wall. Further, the plurality of cells defines a top surface. In addition, the energy storage device includes an exhaust manifold adjacent to the front side wall between at least a portion of the cells and the air inlet. Thus, the exhaust manifold is configured to direct airflow from the top surface of the cells towards the bottom side wall of the housing and then up to the air outlet so as to provide an airflow barrier between cooling air entering the air inlet and the cells.

The present disclosure has many advantages not present in the prior art. For example, the exhaust manifold reduces the temperature gradient across the cells by redirecting the heat exhaust from the top surface of the cells to the interface between the air inlet and the front of the cells. Thus, the exhaust manifold prevents overcooling of the front cells. Lowering the temperature gradient across the cells allows a cooling air blower to be run longer, which allows the battery to be cooled faster during recharge. Faster recharge allows customers to get more energy throughput from the battery. In addition, cooling during discharge can provide longer run time for the battery by reducing the peak temperature. Further, a lower temperature also slows cell degradation and thus improves battery life.

Referring now to the drawings, FIG. 1 is an illustration of one embodiment of a hybrid power system 100, e.g. for a telecom base transceiver station (BTS), that can benefit from the energy storage device 142 of the present disclosure. In addition, it should be understood by those of ordinary skill in the art that the energy storage device 142 of the present disclosure can be used in any other suitable battery application, e.g. grid-connected energy storage, motive-based storage, and/or similar, and the embodiment of FIG. 1 is provided for illustrative purposes only. As shown, FIG. 1 depicts multiple sources of power including an AC power grid 110, an engine-generator power source or engine-generator set (EGS) 120, alternative energy source 130, and a battery power source 140, which, as shown, includes a plurality of energy storage devices 142. A transfer switch 115 allows transfer of operation between the AC power grid 110 and the EGS 120, as well as other AC electrical power that may be available. The EGS 120 typically runs on fuel (e.g., diesel fuel) provided by a fuel source 125 (e.g., a storage tank). An availability switch 135 allows for alternate energy sources 130 (e.g. solar, wind, or fuel cell), if available, to be switched in to a DC bus 145 or an AC bus 155 of the power system 100 as well. If switching into the AC bus 155, an inverter 170 (described below) can be coupled between the alternate energy source 130 and the AC bus 155.

The battery power source 140 is an electrical power source. More specifically, in certain embodiments, the battery power source 140 may include one or more energy storage devices, e.g. battery modules 142. Such battery modules 142 may contain any suitable batteries known in the art. For example, in various embodiments, the battery modules 142 may contain one or more sodium nickel chloride batteries, sodium sulfur batteries, lithium ion batteries, nickel metal hydride batteries, fuel battery cells, or similar. More specifically, in certain embodiments, the battery modules 142 may include a plurality of sodium nickel chloride cells 162 arranged in a matrix, e.g. in a plurality of rows and columns. In addition, in particular embodiments, each of the cells 162 may include a ceramic electrolyte material that separates the electrodes of adjacent cells. Thus, during charging, chloride ions may be released from sodium chloride and combined with nickel to form nickel chloride. The sodium ions that remain can move through the electrolyte into a reservoir. When the battery produces power, the ions move back through the electrode and the reaction is reversed. The process typically occurs at about 300 degrees Celsius (° C.) inside an insulated container or inner housing 146 (FIGS. 3-4). Sodium nickel chloride batteries are particularly suitable due to their short charge times that can drive the EGS 120 to peak efficiency, thereby reducing fuel costs for the BTS. In addition, sodium nickel chloride battery performance is not affected by ambient temperature; therefore, such batteries can be used at sites with extreme temperature variations. Further, the battery modules 142 are typically available in three size ranges, namely kWh, MWh and GWh.

Referring still to FIG. 1, the AC bus 155 provides AC power to drive AC loads 160 of the system such as, for example, lighting and/or air conditioning of a telecom base transceiver station (BTS). Furthermore, the AC bus 155 can provide AC power to a bi-directional inverter 170 which converts AC power to DC power which provides DC power to the DC bus 145 to drive DC loads 180 of the power system 100. Example DC loads of the power system 100 include radios, switches, and amplifiers of the BTS. The DC bus 145 also provides DC power from the inverter 170 to charge the battery power source 140 and provides DC power from the battery power source 140 to the DC loads 180 as the battery power source 140 discharges. The inverter 170 may regulate DC power from a DC electrical power source (e.g., a solar energy system or a fuel cell energy system) instead of an AC electrical power source. In general, a primary power source may provide AC or DC electrical power that is used by an energy storage device (e.g., by the DC battery power source 140) of the power system 100.

During operation of the hybrid power system 100, when the EGS 120 is on, the EGS 120 is configured to provide power to the DC loads 180 and to the battery power source 140 during a charging part of the cycle. When the EGS 120 is off, the battery power source 140 is configured to provide power to the DC loads 180 during a discharging part of the cycle. Further, the battery power source 140 may be controlled by a battery management system (BMS) 144. As used herein, the BMS 144 generally refers to any electronic system that manages a rechargeable battery module (e.g. cell or battery pack), such as by protecting the battery module from operating outside a safe operating mode, monitoring a state of the battery module, calculating and reporting operating data for the battery module, controlling the battery module environment, and/or any other suitable control actions. For example, in several embodiments, the BMS 144 is configured to monitor and/or control operation of one or more energy storage devices (e.g. the battery modules 142). Further, the BMS 144 may be configured to communicate with the EGS 120 by sending a start-up command so as to start-up the engine of the EGS 120 in accordance with control logic of the BMS 144. In addition, the BMS 144 may be, for example, a logic controller implemented purely in hardware, a firmware-programmable digital signal processor, or a programmable processor-based software-controlled computer.

The power system 100 may also include a controller 190 that is configured to monitor and/or control various aspects of the power system 100 as shown in FIGS. 1 and 2. For example, the controller 190 may be configured to command the engine of the EGS 120 to turn on or off in accordance with control logic of the controller 190. In accordance with various embodiments, the controller 190 may be a separate unit (as shown) or may be part of the BMS 144 of the battery power source 140.

Referring now to FIGS. 2-14, various views of an energy storage device 142 having reduced temperature variability between cells according to the present disclosure is illustrated. As shown particularly in FIGS. 2 and 3, the energy storage device 142 includes an inner housing 146 contained within an outer housing 143. Further, as shown, the inner housing 146 has one or more side walls 148 that define an internal volume 150 thereof. More specifically, as shown, the side walls 148 include, at least, a bottom side wall 152 and a front side wall 154, with the front side wall 154 having an air inlet 156 and an air outlet 158. In addition, as shown, the energy storage device 142 also includes a plurality of cells 162 (e.g. sodium nickel chloride cells) arranged in a matrix within the internal volume 150 of the inner housing 146, e.g. atop the bottom side wall 152 of the inner housing 146. Further, the cells 162 define a top surface 164. In addition, as shown in FIG. 14, the energy storage device 142 may also include an intake manifold 172 and an exhaust manifold 166 configured between the front row 168 of cells 162 and the air inlet and outlet 156, 158. Thus, the intake manifold 172 may be configured with an airflow distribution network 192 such that incoming cooling air is transferred beneath the cells 162 when the cells need to be cooled. Further, the exhaust manifold 166 reduces the battery cell temperature gradient, which will be discussed in more detail below. Moreover, the energy storage device 142 may also include an electrical connector 165 configured to electrically couple the energy storage device 142, e.g. to the BMS 144 as described herein.

Referring particularly to FIG. 14, the airflow distribution network 192 may be configured with the bottom side wall 152 of the inner housing 146 and may extend longitudinally from a rear side wall 153 to the front side wall 154 of the inner housing 146 (FIGS. 3-4). Thus, the airflow distribution network 192 is configured to direct airflow from the air inlet 156 to the rear side wall 153 and then to the top surface 164 of the cells 162. More specifically, in certain embodiments, the airflow distribution network 192 may include one or more airflow pipes covered by a sump plate (not shown). In addition, the sump plate may include a plurality of perforations and/or a corrugated profile defining channels for the one or more airflow pipes. For example, in one embodiment, the airflow distribution network 192 may include cooling airflow pipes contained within perforated sump plate channels. As such, the perforations are configured to allow cooling air to flow through the energy storage device 142 with minimal pressure drop.

Referring generally to FIGS. 5-14, various views of an exhaust manifold 166 configured to reduce temperature variability between the cells 162 of the energy storage device 142 according to the present disclosure are illustrated. More specifically, as shown in FIG. 14, the exhaust manifold 166 can be positioned adjacent to the front side wall 154 of the inner housing 146 between at least a portion of the cells 162 (i.e. a front row 168 of the cells 162) and the air inlet 156. Thus, the exhaust manifold 166 is configured to direct airflow from the top surface 164 of the cells 162 towards the bottom side wall 152 of the inner housing 146 and then up to the air outlet 158 so as to provide an airflow barrier 174 between cooling air entering the air inlet 156 and the cells 162.

It should be understood that the exhaust manifold 166 may be configured according to any suitable arrangement that directs airflow as described herein. More specifically, as shown in FIGS. 5-13, the exhaust manifold 166 may include a plurality of thermal plates 175 arranged in a stacked configuration. More specifically, the thermal plates 175 may include one or more electrical insulation plates 175 (e.g. mineral plates) and at least one baffle plate 194 stacked together so as to direct exhaust air in front of the air inlet 156 before exiting through the air outlet 158.

More specifically, the thermal plates 175 may include one or more passageways (e.g. 188, 195, 198) such that, when arranged together in a predetermined configuration, provide an air path that directs airflow as described herein. Thus, FIGS. 5-13 illustrate various perspective views of one embodiment of an exhaust manifold 166 with different plates removed to further illustrate the various components of the manifold 166 according to the present disclosure.

For example, as shown in FIG. 5, the exhaust manifold 166 may include an insulation cover plate 176, e.g. configured on a battery-side of the exhaust manifold 166. More specifically, in certain embodiments, as shown, the insulation cover plate 176 may be configured to protect the insulation of the energy storage device 142 as the insulation can be delicate to handle and easily damaged. Thus, as shown, the insulation cover plate 176 does not contain airflow passageways and can also be configured to close out the airflow passageways 188, 195, 198 of the manifold 166. In addition, the exhaust manifold 166 can be assembled as a loose assembly and held in place by way of a compression fit between the cells and/or other components of the energy storage device 142.

Referring now to FIG. 6, as shown with the insulation cover plate 176 removed, the exhaust manifold 166 may also one or more busbars 199 and a corresponding busbar support plate 178. Thus, as shown, the busbar support plate 178 is configured to support the busbars 199, e.g. by providing a mounting surface for the busbars 199. As shown in FIG. 6, with the busbar support plate 178 removed, the exhaust manifold 166 may also include a manifold end cover 179. More specifically, as shown, the manifold end cover 179 provides a cover to the exhaust manifold 166 so as to control airflow.

Referring now to FIG. 8, as shown with the manifold end cover 179 removed, the exhaust manifold 166 may also include a first mineral plate 193, e.g. adjacent to the baffle plate 194 of FIG. 9. Thus, as shown, the first mineral plate 193 includes one or more airflow passageways 188 configured to direct the airflow towards the bottom side wall 152 of the inner housing 146 and through the baffle plate 194. More specifically, as shown, the passageways 188 may extend in a height-wise direction of the energy storage device 142, i.e. between the top surface 164 of the cells 162 and the bottom side wall 152 of the inner housing 146. Further, as shown, the top portion of the passageways 188 may be open such that air can easily flow down through the passageways from the top surface 154. Moreover, in certain embodiments, the number of airflow passageways 188 of the first mineral plate 193 may correspond to the number of cells 162 in the 168 front row 168 of the matrix adjacent to the front side wall 154 of the inner housing 146. For example, as shown, the exhaust manifold 166 includes a total of six airflow passageways 188. In further embodiments, the exhaust manifold 166 may include more than six airflow passageways 188 or less than six passageways 188.

Referring now to FIG. 9, as shown with the cover plate 176 and the first mineral plate 193 removed, the baffle plate 194 is illustrated adjacent to the a second mineral plate 197 (FIG. 10). As shown, the baffle plate 194 may also include one or more airflow passageways 195 in fluid communication with the one or more airflow passageways 188 of the first mineral plate 193. More specifically, as shown, the passageways 195 may be located along a bottom edge 196 of the baffle plate 194 so as to direct air from the airflow passageways 188 of the first mineral plate 193 through the baffle plate 194 and then up towards the air outlet 158. In addition, as shown, the passageways 195 of the baffle plate 194 substantially align with the passageways 188 of the first mineral plate 193 so as to redirect the airflow from the first mineral plate 193.

Referring now to FIG. 10, as shown with the cover plate 176, the first mineral plate 193, and the baffle plate 194 removed, the second mineral plate 197 is illustrated adjacent to the thermal plates 175 of FIGS. 11 and 12. Further, as shown, the second mineral plate 197 includes one or more airflow passageways 198 in fluid communication with the one or more airflow passageways 195 of the baffle plate 194 so as to direct the airflow up towards the air outlet of the inner housing. Further, as shown, the airflow passageway(s) 198 of the second mineral plate 197 may be configured similar to the airflow passageways 188 of the first mineral plate 193, i.e. the passageways 188 may extend in a height-wise direction of the energy storage device, i.e. between the top surface 164 of the cells 162 and the bottom side wall 152 of the inner housing 146.

Referring now to FIGS. 11 and 12, the exhaust manifold 166 may also include one or more additional thermal plates 175 arranged closest to the BMS 144, i.e. adjacent to the front side wall 154 of the inner housing 146. Further, such thermal plates 175 may have one or more openings 185 that allow airflow to pass therethrough. More specifically, as shown in FIG. 11, at least one of the thermal plates 175 (i.e. the plate 175 closest to the cells 162) may have a closed bottom portion 187 that provides an airflow barrier from the air inlet 156. In addition, as shown in FIG. 12, at least one of the thermal plates 175 (i.e. the plate 175 closest to the front side wall 154 of the inner housing 146) may have a bottom opening 189 that directs air entering the air inlet 156 into the airflow distribution network 192. Thus, such thermal plates 175 properly direct the airflow after it is redirected via the baffle plate 194.

It should be understood that the thermal plates 175 as described herein may be constructed of any suitable thermal material. For example, as mentioned, one or more of the thermal plates 175 may be constructed, at least in part, of an electrical insulation material, e.g. a mineral plate. In such embodiments, the mineral plates 175 may be constructed, at least in part, of mica. Such materials are particularly advantageous in the exhaust manifold 166 due to temperature compatibility (e.g. up to 400 degrees Celsius (° C.)), insulation properties, manufacturability, and/or cost. In additional embodiments, the thermal plates 175 may be constructed of a conductive material, e.g. a metal or a metal alloy. For example, in one embodiment, the thermal plates 175 may be constructed, at least in part, of copper, aluminum, steel, zinc, brass, iron, nickel, and/or similar, or combinations thereof. Further, the thermal plates 175 as described herein may have any suitable thickness. For example, in certain embodiments, the thickness of the thermal plates 175 may range from about 0.5 millimeters (mm) to about 2 mm.

During battery float, the battery cell temperature should be maintained at a predetermined temperature (e.g. at about 280 degrees Celsius (° C.)). During discharge and recharge of the energy storage device 142, the cells 162 need to be cooled using external air. Thus, airflow can be provided via the air inlet 156 to cool the intake manifold 172 which absorbs heat from the cells 162. More specifically, as shown in FIG. 15, a flow diagram of a method 200 for reducing temperature variability between the cells 162 in an energy storage device 142 is illustrated. As shown at 202, the method 200 includes providing cooling air through the air inlet 156, e.g. as shown in FIG. 14. The air inlet 156 is in fluid communication with the airflow distribution network 192 located on the bottom side wall 152, e.g. underneath the plurality of cells 162. Accordingly, as shown at 204, the method 200 includes circulating the cooling air through the airflow distribution network 192 to the top surface 164 of the energy storage device 142. As shown at 206, the method 200 includes recirculating the air from the top surface 164 of the cells 162 back to the bottom side wall 152 at the front side wall 154 and then to the air outlet 158 so as to provide an airflow barrier 174 between cooling air entering the air inlet 156 and the front row 168 of the cells 162, e.g. as shown in FIG. 14. Thus, the barrier 174 created by the exhaust manifold 166 prevents the front cells 162 from being overcooled, thereby providing uniform cooling during battery operation.

More specifically, as shown, the step of recirculating the air from the top surface 164 back to the bottom side wall 152 at the front side wall 154 and then to the air outlet 156 may further include positioning the exhaust manifold 166 between the front row 168 of the cells 162 and the front side wall 154 of the inner housing 146 and circulating the cooling air through the exhaust manifold 166 to the air outlet 158. In specific embodiments, the method 200 may also include arranging a plurality of electrical insulation plates 175 (e.g. mineral plates) in a stacked configuration and intermittently placing a plurality of thermal plates 175 between the stacked mineral plates 175 to form the exhaust manifold 166. Thus, in such embodiments, the method 200 may further include circulating the cooling air through one or more air passageways 188 of a first mineral plate 193 (FIG. 8) towards the bottom side wall 152 of the inner housing 146. In addition, the method 200 may include circulating the cooling air through the passageways 195 of the baffle plate 194 (FIG. 9) to the passageways 198 of the second mineral plate 197 such that the air passageways of the second mineral plate 197 direct the air up towards the air outlet 158 of the inner housing 146 (FIG. 10).

Further, as shown in FIGS. 11 and 12, the method 200 may include circulating the cooling air through the openings 185 of one or more additional thermal plates 175 and to the air outlet 158. For example, as shown in FIG. 11, at least one of the additional thermal plates 183 may have a closed bottom portion 187 that provides an airflow barrier between the air inlet 156. Further, as shown in FIG. 12, at least another one of the additional thermal plates 184 may have a bottom opening 189 that directs air entering the air inlet 156 into the airflow distribution network 196.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage device, comprising:
   a housing comprising one or more side walls that define an internal volume, the side walls comprising, at least, a bottom side wall and a front side wall, the front side wall comprising an air inlet and an air outlet defined through the front side wall;
   a plurality of cells arranged in a matrix within the internal volume atop the bottom side wall and defining a top surface; and,
   an exhaust manifold adjacent to the front side wall between at least a portion of the cells and the air inlet and the air outlet,
   wherein the exhaust manifold directs airflow entering the air inlet through an airflow distribution network in the bottom side wall of the housing to the top surface of the cells and then recirculates the airflow back to the bottom side wall of the housing and to the air outlet so as to provide an airflow barrier between cooling air entering the air inlet and the cells.

2. The energy storage device of claim 1, wherein the airflow distribution network extends from the front side wall to a rear side wall of the housing, wherein the airflow distribution network is further configured to direct airflow from the air inlet to the rear side wall and then to the top surface of the cells.

3. The energy storage device of claim 2, wherein the exhaust manifold further comprises a plurality of thermal plates arranged in a stacked configuration.

4. The energy storage device of claim 3, wherein the thermal plates comprise a plurality of electrical insulation plates and at least one baffle plate arranged intermittently between the stacked electrical insulation plates.

5. The energy storage device of claim 4, further comprising a first electrical insulation plate having one or more airflow passageways configured to direct the airflow towards the bottom side wall of the housing.

6. The energy storage device of claim 5, wherein a number of airflow passageways of the first electrical insulation plate corresponds to a number of cells in a front row of the matrix adjacent to the front side wall of the housing.

7. The energy storage device of claim 5, further comprising at least one baffle plate adjacent to the first electrical insulation plate on a battery-management-system side thereof, the baffle plate comprising one or more airflow passageways in fluid communication with the one or more airflow passageways of the first electrical insulation plate so as to redirect airflow from the first electrical insulation plate.

8. The energy storage device of claim 7, further comprising a second electrical insulation plate adjacent to the baffle plate on a battery-management-system side thereof, the second electrical insulation plate comprising one or more airflow passageways in fluid communication with the one or more airflow passageways of the baffle plate, wherein the one or more airflow passageways of the second electrical insulation plate are configured to direct the airflow towards the air outlet of the housing.

9. The energy storage device of claim 8, further comprising one or more additional thermal plates adjacent to the second electrical insulation plate on a battery-management-system side thereof, the one or more additional thermal plates having one or more openings in fluid communication with the one or more airflow passageways of the second electrical insulation plate, wherein at least one of the additional thermal plates has a closed bottom portion that provides an airflow barrier from the air inlet, and wherein at least another one of the additional thermal plates has a bottom opening that directs air entering the air inlet into the airflow distribution network.

10. The energy storage device of claim 4, wherein the plurality of electrical insulation plates are constructed, at least in part, of mica.

11. The energy storage device of claim 4, wherein the at least one baffle plate is constructed, at least in part, of copper, aluminum, steel, zinc, brass, iron, nickel, or combinations thereof.

12. The energy storage device of claim 1, further comprising an end cover configured on a battery-side of the first electrical insulation plate.

13. The energy storage device of claim 1, wherein the energy storage device comprises at least one of a sodium nickel chloride battery, a sodium sulfur battery, a lithium ion battery, or a nickel metal hydride battery.

14. An exhaust manifold for an energy storage device having multiple cells, the exhaust manifold comprising:
- a plurality of electrical insulation plates arranged in a stacked configuration; and,
- at least one baffle plate configured between the plurality of stacked electrical insulation plates,
- wherein the stacked plates are configured to direct airflow from a top surface of the cells towards a bottom side wall of the housing of the energy storage device and then to an air outlet of the energy storage device so as to provide an airflow barrier between cooling air entering an air inlet of the energy storage device and the cells.

15. A method for reducing temperature variability between a plurality of cells in an energy storage device, the energy storage device having a housing with a bottom side wall and a front side wall, the front side wall having an air inlet and an air outlet, the method comprising:
- providing cooling air through the air inlet, the air inlet being in fluid communication with an airflow distribution network located on the bottom side wall underneath the plurality of cells;
- circulating the cooling air through the airflow distribution network to a top surface of the energy storage device; and,
- recirculating the air from the top surface down to the bottom side wall at the front side wall and then up to the air outlet so as to provide an airflow barrier between cooling air entering the air inlet and the cells.

16. The method of claim 15, wherein recirculating the air from the top surface back to the bottom side wall at the front side wall and then to the air outlet further comprises:
- positioning an exhaust manifold between a front row of the cells and the front side wall of the housing, and circulating the cooling air through the exhaust manifold.

17. The method of claim 16, further comprising arranging a plurality of electrical insulation plates in a stacked configuration and intermittently placing at least one baffle plate between the stacked electrical insulation plates to form the exhaust manifold.

18. The method of claim 17, further comprising circulating the cooling air through one or more air passageways of a first electrical insulation plate towards the bottom side wall of the housing.

19. The method of claim 18, further comprising circulating the cooling air through the baffle plate and to a second electrical insulation plate, wherein one or more air passageways of the second electrical insulation plate direct the air up towards the air outlet of the housing.

20. The method of claim 19, further comprising circulating the cooling air through one or more openings of one or more additional thermal plates adjacent to the second electrical insulation plate on a battery-management-system side thereof and to the air outlet, wherein at least one of the additional thermal plates has a closed bottom portion that provides an airflow barrier from the air inlet, and wherein at least another one of the additional thermal plates has bottom opening that directs air entering the air inlet into the airflow distribution network.

* * * * *